(12) United States Patent
Venneri

(10) Patent No.: US 10,796,324 B2
(45) Date of Patent: Oct. 6, 2020

(54) AUTOMATED SOCIAL NETWORK MESSAGING USING NETWORK EXTRACTED CONTENT

(71) Applicant: ResponseLogix, Inc., Scottsdale, AZ (US)

(72) Inventor: Alexi Venneri, Scottsdale, AZ (US)

(73) Assignee: ResponseLogix, Inc., Scottsdale, AZ (US)

( * ) Notice: Subject to any disclaimer, the term of this patent is extended or adjusted under 35 U.S.C. 154(b) by 461 days.

(21) Appl. No.: 14/951,445

(22) Filed: Nov. 24, 2015

(65) Prior Publication Data

US 2016/0148231 A1    May 26, 2016

Related U.S. Application Data

(60) Provisional application No. 62/085,144, filed on Nov. 26, 2014.

(51) Int. Cl.
| | |
|---|---|
| *G06Q 30/02* | (2012.01) |
| *H04L 12/58* | (2006.01) |
| *G06Q 50/00* | (2012.01) |
| *G06F 40/174* | (2020.01) |

(52) U.S. Cl.
CPC ....... *G06Q 30/0203* (2013.01); *G06F 40/174* (2020.01); *G06Q 50/01* (2013.01); *H04L 51/32* (2013.01)

(58) Field of Classification Search
CPC . G06Q 30/0203; G06Q 30/0201; G06Q 50/01

USPC .................................................... 705/7.32
See application file for complete search history.

(56) References Cited

U.S. PATENT DOCUMENTS

| | | | | |
|---|---|---|---|---|
| 2001/0037206 A1* | 11/2001 | Falk | ................ | G06Q 30/02 |
| | | | | 705/1.1 |
| 2013/0014153 A1* | 1/2013 | Bhatia | ................ | H04N 21/252 |
| | | | | 725/24 |
| 2013/0218721 A1* | 8/2013 | Borhan | ................ | G06Q 20/322 |
| | | | | 705/26.41 |

OTHER PUBLICATIONS

Willemsen et al. (Highly Recommended! The Content Characteristics and Perceived Usefulness of Online Consumer Reviews, Journal of Computer-Mediated Communication, vol. 17, Issue 1, Oct. 1, 2011, pp. 19-38, https://doi.org/10.1111/j.1083-6101.2011.01551.x, Published: Oct. 1, 2011).*

* cited by examiner

*Primary Examiner* — Matthew D Henry
(74) *Attorney, Agent, or Firm* — Carr & Ferrell LLP

(57) ABSTRACT

The present disclosure is generally related to systems and methods that automatically created trusted social media reviews based on consumer feedback extracted from information sources. A method includes extracting at least a portion of responses from a survey questionnaire, populating a web form with the extracted the at least a portion of responses to create a social network message. The web form can have selectable links to social networks. The method also includes receiving selections of the social networks and providing the social network message to the selected social networks.

17 Claims, 14 Drawing Sheets

Richey Toyota of Austin
932 Hamlin Court, Sunnyvale, CA 94089

{{customer_first_name}},

{{dealer_name}} values our customers and thanks you for visting us. Our customers are our greatest asset and we always welcome feedback. Please take just two minutes to answer four questions, in order to tell us how we're doing.

Launch survey

Thank you for sharing your experience with us.

Sincerely,

{{dealer_name}}

You are receiving this message and may continue receiving periodic communications because you recently visited our dealership. If you are no longer interested in receiving these mailings, please unsubscribe. Should you wish to opt out through postal mail, please write to us at:

{{dealer_street}}
{{dealer_city}}, {{dealer_state}} {{dealer_zip}}

Dealer Identifier
    ID may be populated for particular social media on the Access Information page
One of these values
    SHOPNEW (customer record designated as "New" in the Sales DMS file)
    SHOPUSED (customer record designated as "Used" or "CPO" in the Sales DMS file)
    SVCREPAIR (customer record in the Service DMS file)
Customer's IP address
Customer first name
Customer City
Customer email address
Dealership Employee?
    Pass "false" each time
Purchase vehicle?
    Pass "true" for all Sales customers
    Pass "false" for all Service customers
Review title
Customer's survey feedback from question #3 on the survey landing page
Overall star rating (1 - 5 stars)
    Format = 1.0, 2.0, 3.0, 4.0, 5.0
Customer service star rating (if provided)
    Use same format as "Overall star rating"
    If customer select "Not Applicable", omit entire category rating element
Buying process star rating (if provided)
    Use same format as "Overall star rating"
    If customer select "Not Applicable", omit entire category rating element
Quality of repairs star rating (if provided)
    Use same format as "Overall star rating"
    If customer select "Not Applicable", omit entire category rating element
Facilities star rating (if provided)
    Use same format as "Overall star rating"
    If customer select "Not Applicable", omit entire category rating element

FIG. 7C

AUTOMATED SOCIAL NETWORK MESSAGING USING NETWORK EXTRACTED CONTENT

CROSS REFERENCE TO RELATED APPLICATIONS

This application claims the benefit of U.S. Provisional Application No. 62/085,144, filed Nov. 26, 2014, which is hereby incorporated by reference herein for all purposes.

FIELD

The present disclosure is generally related to social networking, and more particularly, but not by limitation, to systems and methods that automatically create trusted social media reviews based on consumer feedback extracted from information sources.

SUMMARY

According to some embodiments, the present disclosure is directed to methods that comprise: (a) extracting at least a portion of responses from a survey questionnaire; (b) populating a web form with the extracted the at least a portion of responses to create a social network message, the web form comprising links to social networks, review sites and listings directories; (c) receiving selections of the social networks; and (d) providing the social network message to the selected social networks.

According to some embodiments, the present disclosure is directed to methods that comprise: (a) receiving transaction information from a provider; (b) retrieving a provider configuration; (c) sending a survey location to a user; (d) provisioning a survey questionnaire to the user based on the survey location; (e) receiving a survey response from the user; (f) determining a survey response type; (g) presenting an offer to produce the trusted social media review to the user based on the survey response type; (h) receiving an offer response from the user; (i) directing the user to an at least partially populated social media web page; (j) generating a report, the report summarizing a plurality of survey responses and trusted social media reviews; and (k) sending the report to the provider.

According to some embodiments, the present disclosure is directed to systems that comprise: (a) a survey system that: (i) transmits a survey questionnaire to a customer (also referred to as a consumer) of a merchant; (ii) extracts at least a portion of responses from the survey questionnaire; (iii) populates a web form with the extracted the at least a portion of responses to create a social network message, the web form comprising links to social networks; (iv) receives selections of the social networks; and (v) provides the social network messages to the selected social networks; and (b) a social network of the social networks that: (1) authenticates the customer; (2) receives the social network message; and (3) posts the social network message for display.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 4 is a screenshot of a message that includes a link to a survey questionnaire, according to various embodiments.

FIG. 5 is a screenshot of a graphical user interface of a survey questionnaire, in accordance with some embodiments.

FIG. 7C is an example extensible markup language format output generated from survey questionnaire information, in accordance with some embodiments, in accordance with some embodiments.

DETAILED DESCRIPTION

Some embodiments of the present invention are directed to identifying a verified consumer of goods and/or services, soliciting feedback about the consumer's experience, and producing a trusted review on social media using the received feedback.

Figure 1:
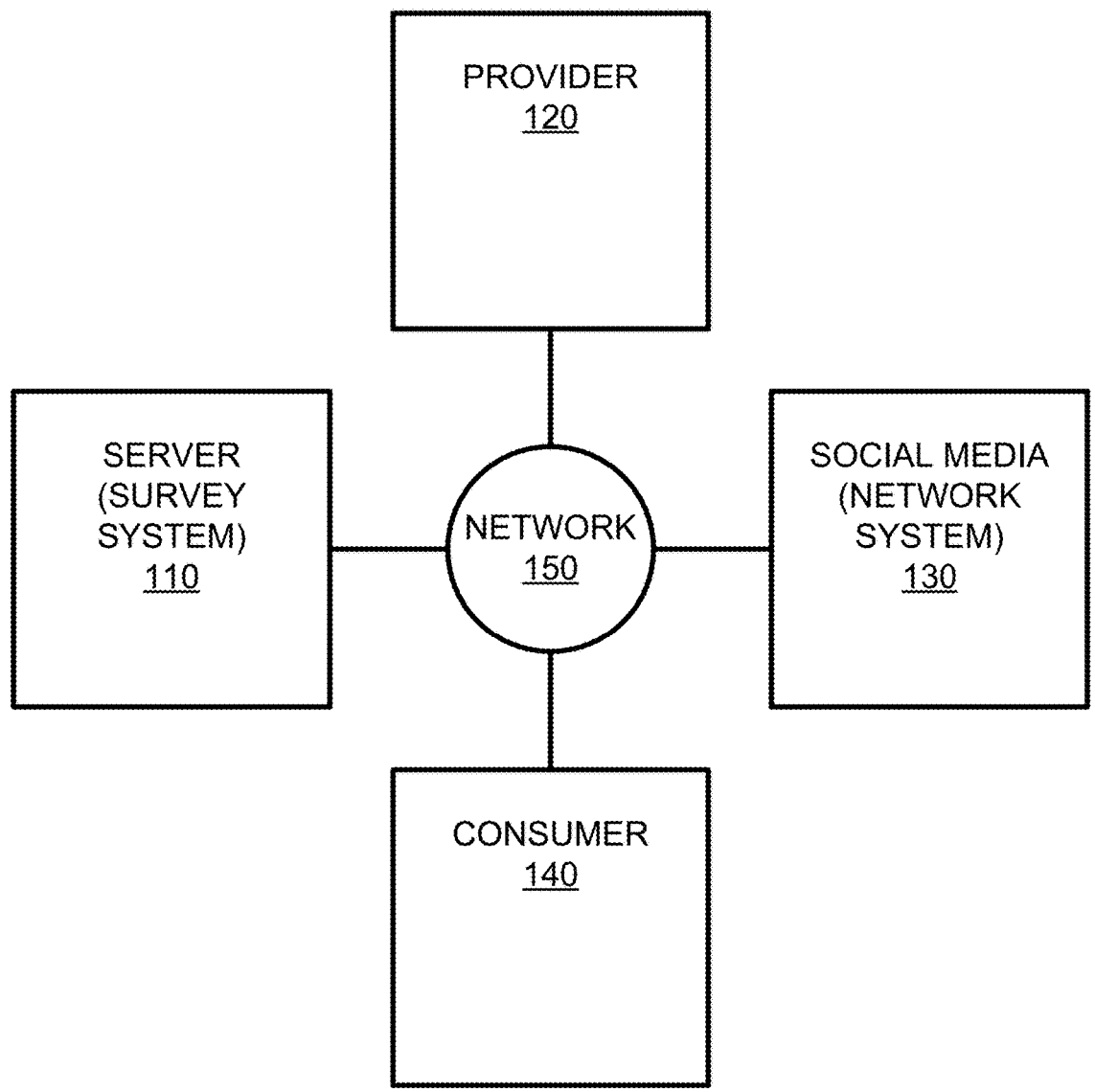
FIG. 1 is a schematic diagram of an example system that can be constructed in accordance with the present disclosure.

FIG. 1 illustrates a system 100 according to various embodiments. System 100 includes a server 110, provider 120, social media 130, consumer 140, and network 150. Server 110 is communicatively coupled over network 150 to provider 120, social media 130, and consumer 140. Provider 120 is a provider of goods and/or services, such as a car dealership. Provider 120 includes computer systems from which personnel (e.g., management, sales staff, etc.) associated with a provider of goods and/or services interact with server 110. Provider 120 also includes an accounting system associated with the provider of goods and/or services, the accounting system comprising at least a data store of consumer information (e.g., name, mailing address, telephone number, email address, contact preference, goods owned and/or services received, etc.) and transaction information (e.g., date of sale, goods and or services sold, cost of goods and/or services, promotions applied, etc.). In some embodiments, transaction information includes consumer engagement and/or interaction with provider 120, such a visit to a physical (e.g., dealership) or virtual (e.g., website) facility associated with provider 120, product and/or service inquiry, request for quotation, and the like.

Social media 130 includes social networks, review sites, and listings directories, and provides a platform for consumer 140 to share information with other consumers of goods and/or services, including at least a review of a provider of goods and/or services (such as provider 120). By way of non-limiting example, social media 130 includes one or more of Cars.com™, Edmunds.com®, Facebook®, Google+™, Yelp®, and the like.

Consumer 140 is an actual purchaser of goods and/or services from provider 120. For example, consumer 140 is a verified purchaser, because provider 120 has a transaction record of a sale to consumer 140. Consumer 140 includes one or more computer systems from which the verified purchaser interacts with at least one of server 110, provider 120, and social media 130.

Network 150 can be any combination of wired and/or wireless networks, including the Internet, corporate wide area network (WAN), office local area network (LAN), cellular network, and the like. Computer systems associated with server 110, provider 120, social media 130, and consumer 140 are described further in relation to FIG. 9.

Figure 2A:
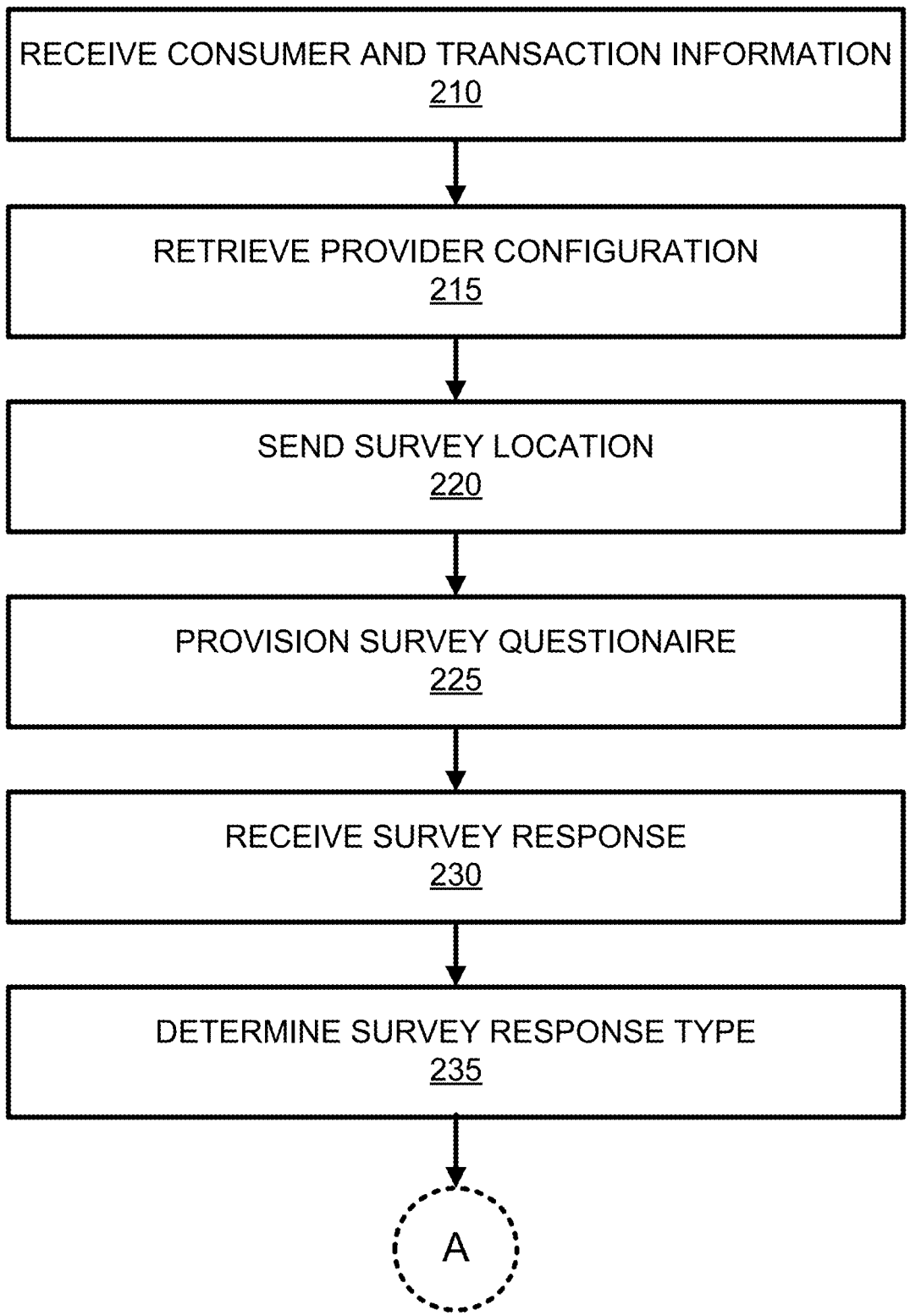
FIG. 2A is a flowchart of a method for providing and provisioning a survey questionnaire, in accordance with some embodiments.

FIG. 2A shows a first part of method 200 for producing a trusted review of provider 120 (FIG. 1) by consumer 140. At step 210, consumer and transaction information is received. For example, consumer and transaction information is received from provider 120 by server 110. In various embodiments, transaction information includes consumer engagement and/or interaction information. Consumer and transaction information from provider 120 may be received at a predetermined interval (e.g., daily/nightly, every other day, once a week, etc.) on a push (e.g., initiated by provider 120) and/or pull (e.g., initiated by server 110) basis.

Figure 3:
FIG. 3 is a screenshot of a graphical user interface that allows a merchant to create a survey questionnaire, according to some embodiments.

At step 215, configuration information for provider 120 (e.g., provider of goods and/or services associated with the transaction information) is retrieved, for example, by server 110. Configuration information includes how to contact and query consumer 140, and actions taken in response to responses from consumer 140. By way of non-limiting example, configuration information is illustrated in FIG. 3.

At step 220, a survey location is sent to consumer 140. For example, a communication (e.g., at least one of an email, short message service (SMS) text message, and the like) is sent by server 110, the message inviting consumer 140 to answer a (brief) survey about their experience with provider 120 and including a link (e.g., uniform resource locator (URL)) to the survey. In some embodiments, the survey location is sent using one or more of the received consumer information, received transaction information, and retrieved transaction information. The communication may include one or more of graphics and text associated with provider 120 and/or of goods and services offered by provider 120, such as a name, contact information, logo, trade and service marks, brands, etc.). By way of example and not limitation, an email including the survey location is depicted in FIG. 4.

Figure 5:
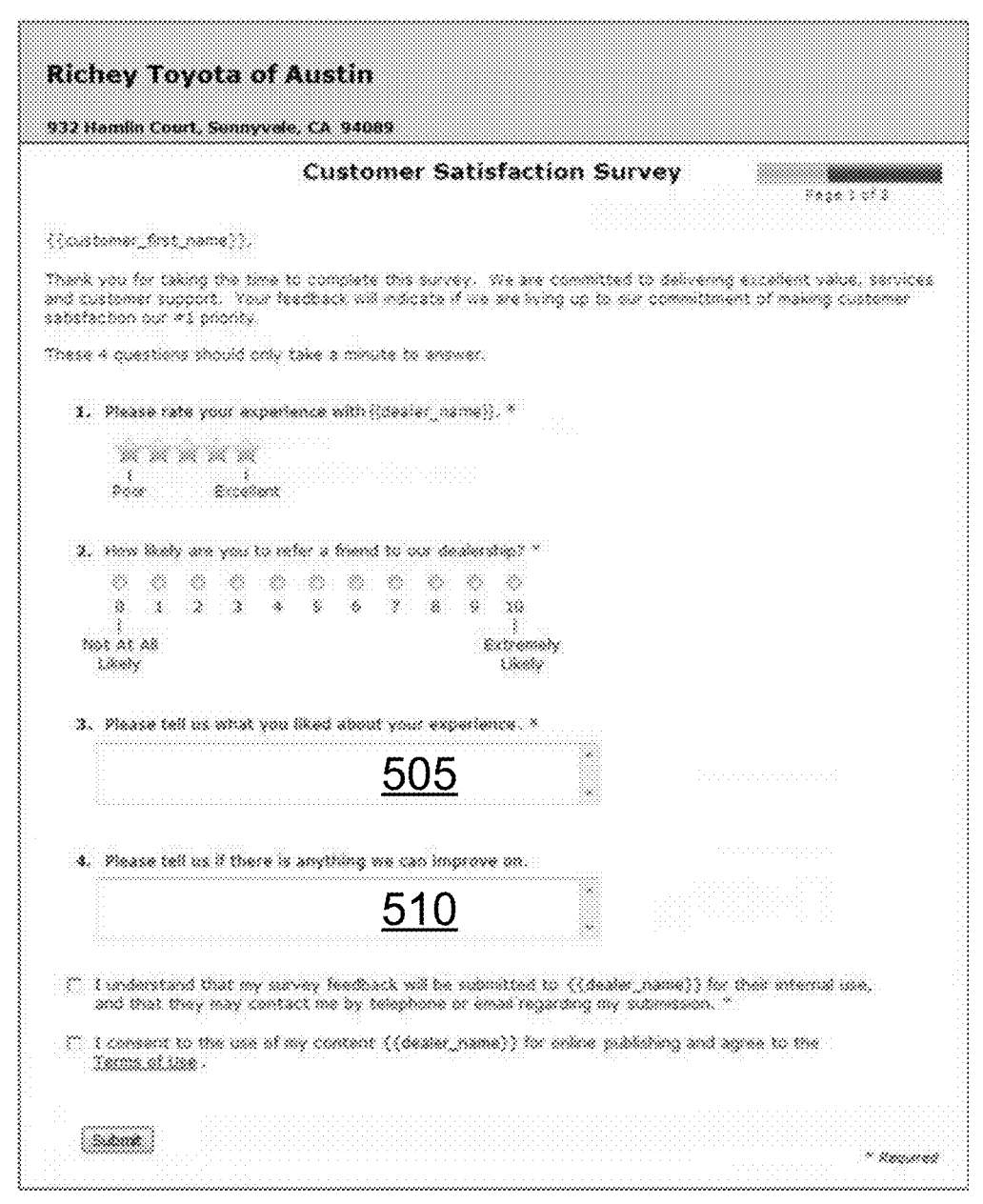

At step 225, the survey is provisioned to consumer 140, for example, by server 110 using/providing a web page associated with the link included in the email message. By way of non-limiting example, FIG. 5 shows a sample survey. FIG. 5 illustrates four questions: how would you rate your experience with this dealership (e.g., scale of 1-5 "stars," where a higher number of stars is more favorable/positive); how likely are you to refer a friend or family member (e.g., scale of 1-10, where 10 is HIGHLY LIKELY); and what else could we have done to make your experience better (fill in the blank). The response to "how likely are you to refer a friend or family member" can be referred to as a net promoter score (NPS). A different number of questions may be used and different/similar questions may be asked.

At step 230, responses to the survey are received from consumer 140, for example, by server 110.

At step 235, a response type is determined from the responses of consumer 140. By way of example and not limitation, the survey may be determined to be positive (e.g., favorable to provider 120) or negative (e.g., unfavorable to provider 120). The response type may be determined using one or a combination of numeric scores received in the responses from consumer 140. By way of example and not limitation, a negative response type is determined in response to an overall "star" rating equal to or less than 3 and/or an NPS equal to or less than seven.

Figure 2B:
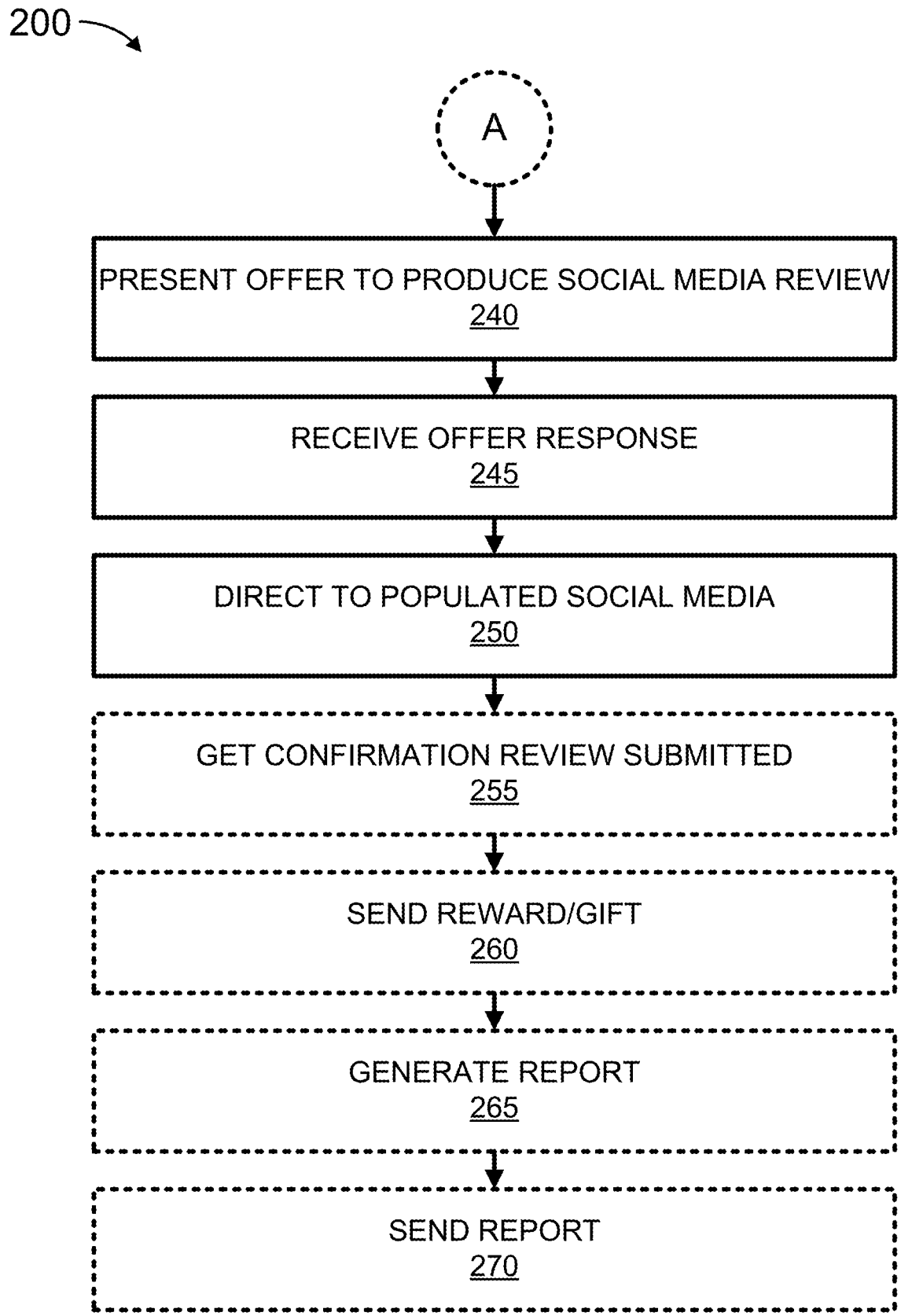
FIG. 2B is a flowchart of a method for creating and posting a trusted social media review, in accordance with various embodiments.
Figure 6:
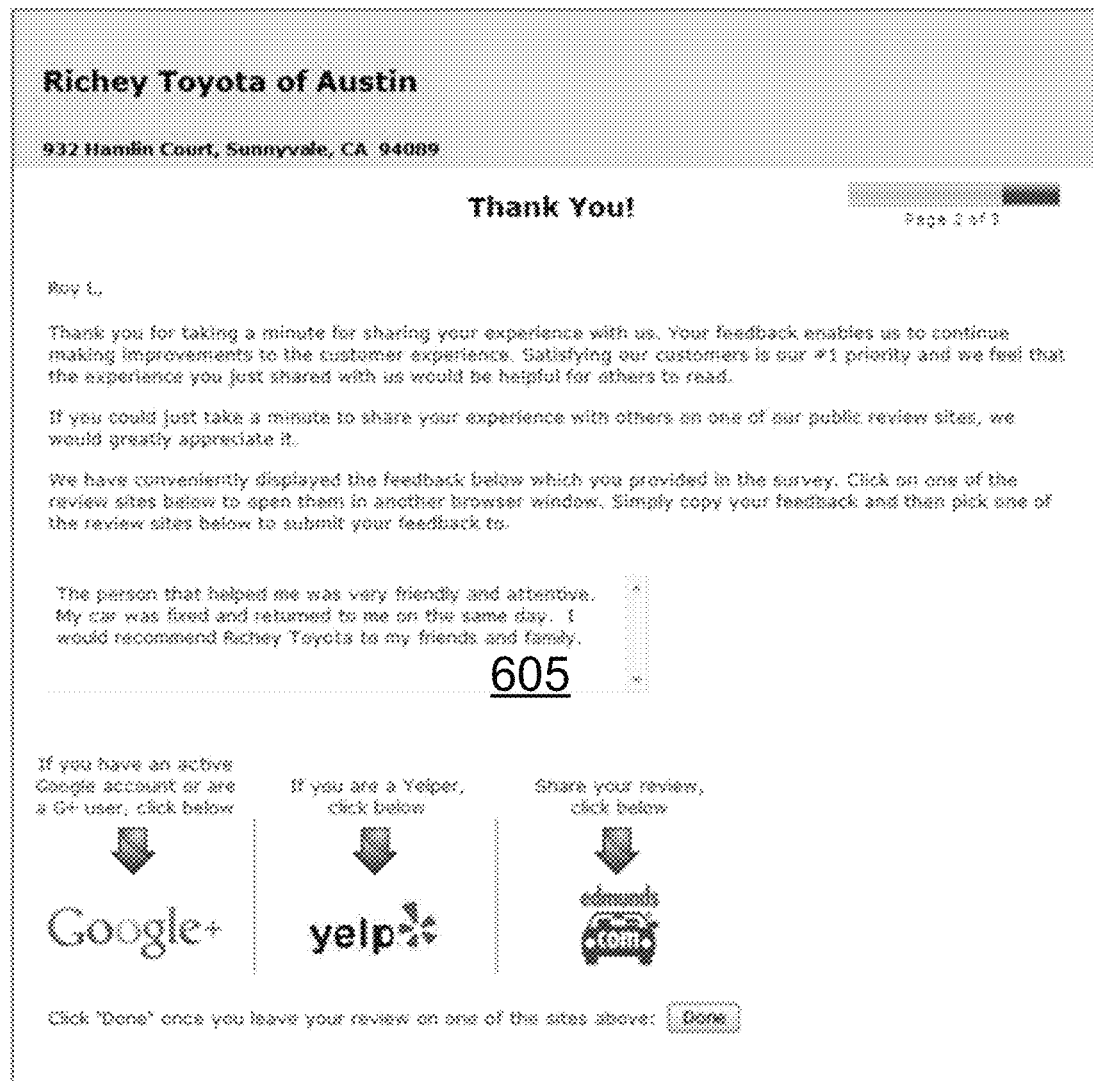
FIG. 6 is a screenshot of a graphical user interface of an offer web form, in accordance with various embodiments.

FIG. 2B shows a second part of method 200 for producing a trusted review of provider 120 by consumer 140 (FIG. 1). At step 240, using the response type an offer to produce a social media review is presented, for example, by server 110. In some embodiments, the offer is presented in response to the response type being positive. In various embodiments, the offer is presented to consumer 140 in response to the response type being positive or negative. Presentation of the offer can be configured by provider 120, as shown in FIG. 3. The offer includes links (e.g., URLs) to web pages associated with one or more social media 130. By way of example and not limitation, FIG. 6 depicts an offer.

At step 245, a response to the offer presented at step 240 (FIG. 2A) is received, for example, by server 110. In some embodiments, consumer 140 selects (e.g., mouse clicks on) a link to social media 130 presented at step 240.

At step 250, consumer 140 is directed to a website associated with social media 130 selected at step 245, for example by server 110. In various embodiments, a new web browser window is opened displaying a review web page of social media 130.

Figure 7A:
FIG. 7A is a screenshot of a graphical user interface of another offer web form that includes a login form for a social network, according to some embodiments.
Figure 7B:
FIG. 7B is a screenshot of a graphical user interface of an additional offer web form that includes a login form for a social network, according to various embodiments.

In some embodiments, step 250 includes providing one or more responses received at step 230 (FIG. 2A) to social media 130, such that the social media review web page is at least partially populated with the one or more response received at step 230. In some embodiments directing to a website of social media 130 includes using a link (e.g., URL) associated with social media 130, an identifier of provider 120 (e.g., user identification, password, certificate/token, etc. for authentication by social media 130), application programming interface (API) associated with social media 130, etc. By way of non-limiting example, FIGS. 7A and 7B illustrate at least partially populated social media review pages. By way of further non-limiting example, FIG. 7C illustrates extensible markup language (XML) data provided by server 110 to social media 130 to populate a social media review page.

The offer presented at step 240 (e.g., FIG. 6) can be updated, for example by server 110. In some embodiments, the offer is updated such that in response to a user selecting a certain one of social media 130 for a review, completing a review at a certain one of social media 130, and the like, the link to the certain one of social media 130 is no longer displayed in the offer.

Optionally at step 255, a confirmation that consumer 140 successfully submitted a review at a particular one of social media 130 is received from the particular one of social media 130.

Optionally at step 260, a reward/gift may be provided to consumer 140 (e.g., for responding to the survey at step 230, providing a social media review confirmed at optional step 255, etc.). For example, the gift/reward may be provided by server 110 in an email, printed in a card/letter and mailed, etc. In various embodiments, the reward/gift may be a gift certificate, discount offer, and the like for goods and/or services from provider 120 (FIG. 1) or a different provider of goods and services. Providing a reward/gift can be included in the configuration information, as shown for example at FIG. 3.

Figure 8:
FIG. 8 is an example report that is generated from a plurality of survey questionnaire responses, in accordance with various embodiments.

Optionally at step 265 a report can be generated. For example, the report summarizes responses received from a plurality of consumer 140. By way of example and not limitation, FIG. 8 depicts a report.

Optionally at step 270, a report associated with provider 120 (FIG. 1) is provided to provider 120. For example, the report may be sent via an email using the configuration information.

Although the above description includes car dealerships in the examples, other providers of goods and/or services may be used. For example, in the broader retail transportation category (in which car dealerships can be included) others may include: recreation vehicles, marine vehicles, motorcycles, and power sport vehicles (ATVs, snowmobiles, jet skis, etc.) and the like may be used. Outside of (retail) transportation, trusted social media review may be used for verticals or industry categories (which make use of public review sites) such as home services, legal/law services, travel, hospitality, on and offline retail, and the like.

Some embodiments of the present invention produce trusted social media reviews from verified consumers. The trusted social media reviews of various embodiments offer the benefit of being more reliable than questionable unverified sources commonly found on social media.

Figure 9:
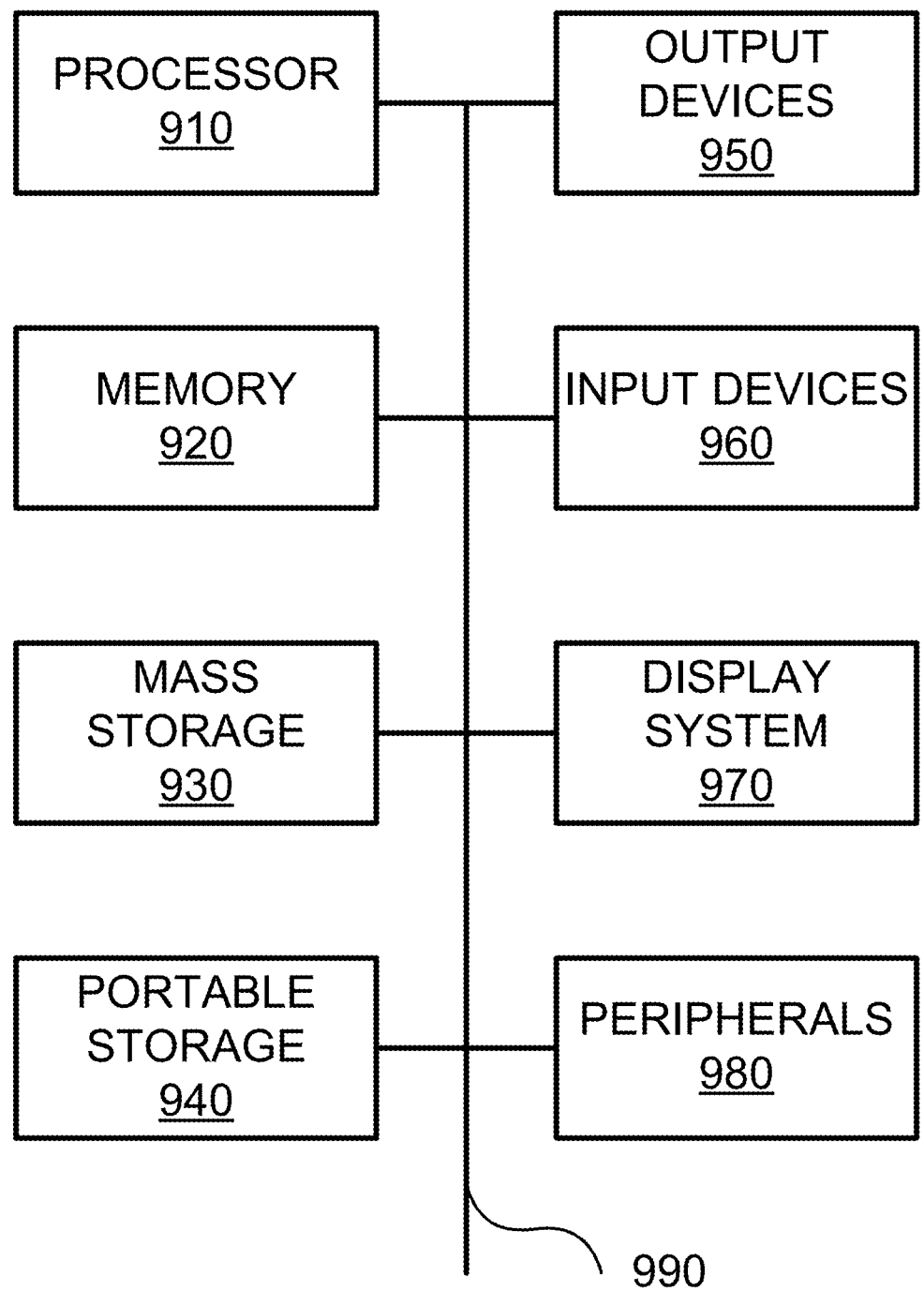
FIG. 9 is a schematic diagram of an example computing device that can be utilized to implement aspects of the present disclosure.

FIG. 9 illustrates an exemplary computer system 900 that may be used to implement some embodiments of the present invention. The computer system 900 in FIG. 9 may be implemented in the contexts of the likes of computing systems, networks, servers, or combinations thereof. The computer system 900 in FIG. 9 includes one or more processor units 910 and main memory 920. Main memory 920 stores, in part, instructions and data for execution by processor units 910. Main memory 920 stores the executable code when in operation, in this example. The computer system 900 in FIG. 9 further includes a mass data storage 930, portable storage device 940, output devices 950, user input devices 960, a graphics display system 970, and peripheral devices 980.

The components shown in FIG. 9 are depicted as being connected via a single bus 990. The components may be connected through one or more data transport means. Processor unit 910 and main memory 920 is connected via a local microprocessor bus, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit 910. Mass data storage 930 stores the system software for implementing embodiments of the present disclosure for purposes of loading that software into main memory 920.

Portable storage device 940 operates in conjunction with a portable non-volatile storage medium, such as a flash drive, floppy disk, compact disk, digital video disc, or Universal Serial Bus (USB) storage device, to input and output data and code to and from the computer system 900 in FIG. 9. The system software for implementing embodiments of the present disclosure is stored on such a portable medium and input to the computer system 900 via the portable storage device 940.

User input devices 960 can provide a portion of a user interface. User input devices 960 may include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 as shown in FIG. 9 includes output devices 950. Suitable output devices 950 include speakers, printers, network interfaces, and monitors.

Graphics display system 970 include a liquid crystal display (LCD) or other suitable display device. Graphics display system 970 is configurable to receive textual and graphical information and processes the information for output to the display device.

Peripheral devices 980 may include any type of computer support device to add additional functionality to the computer system.

The components provided in the computer system 900 in FIG. 9 are those typically found in computer systems that may be suitable for use with embodiments of the present disclosure and are intended to represent a broad category of such computer components that are well known in the art. Thus, the computer system 900 in FIG. 9 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Additional embodiments of the present technology can include methods for automatically generating web forms or web pages with content extracted from survey questionnaires or other customer feedback. The present technology allows for integration between a survey system and one or more social networks, review sites and listings directories (hereinafter collectively referred to as "social networks"), where the survey system can extract content from customer surveys and populate web forms (referred to elsewhere herein as an "offer") that can be further tailored by the customer. The content is used to create a social network message. Once the offer is approved the customer can select one or more social networks that will receive the social network message. The social network message can be delivered to the social network through the survey system in the form of an XML document or other similar output that is configured to the specific message format for a given social network. As mentioned above, some social networks can be accessed with using an API or other means.

In some embodiments, customers can pre-provision the system with login or authentication credentials that can be used to access the customer's social network account. These login credentials can be passed to the social network along with the social network message in any format that is used by the social network system. The customer can provide the system with approval to post to the social network on behalf of the customer, in some embodiments.

Figure 10:
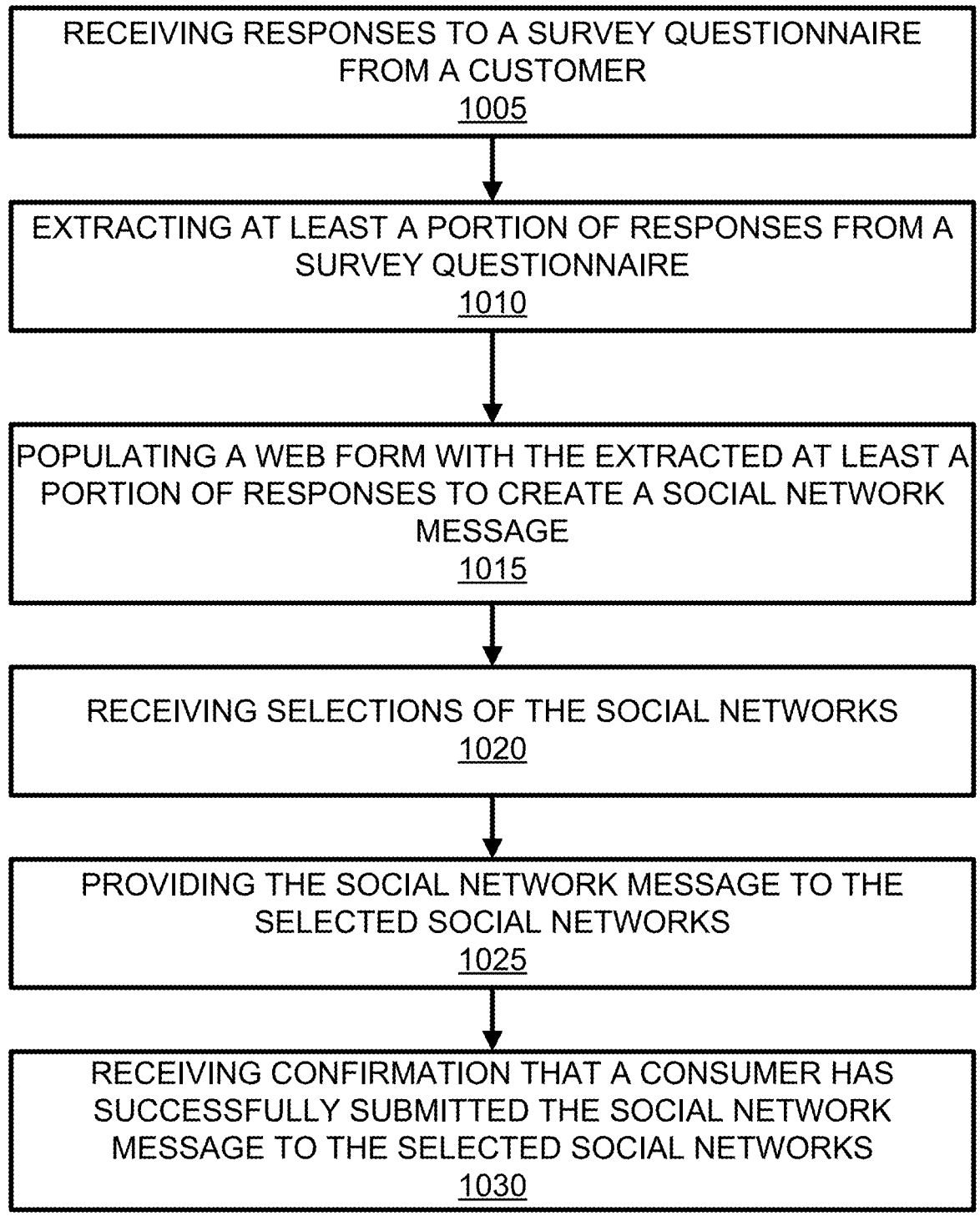
FIG. 10 is a flowchart of a method for automatically generating trusted social network messages from survey content, according to some embodiments.

FIG. 10 illustrates a flowchart of an example method of the present technology. The method involves a process for automatically populating web forms or web pages with content extracted from a survey questionnaire. These web forms are converted, either by the social network system or the survey system, into a social network message that can be posted to a user account on the social network (sometimes referred to as a "feed"). In some embodiments the social network message is incorporated into an HTML web page that is displayed on a merchant's website.

Thus, the method can include receiving 1005 responses to a survey questionnaire from a customer. To be sure, the method can include implementing customer verification features as described above, where the customer can provide identifying information that is unique to the customer. The customer can also be verified using transaction information such as invoice details.

This process of verifying the identity of the customer provides a level of trust that the customer is providing a truthful and/or verifiable opinion about the merchant. Thus, some methods can include steps involving the comparison of transaction information provided by a customer to sales records or customer logs. Customers that can be matched to sales records or customer logs are considered to be verified and more trustworthy that customers that cannot have their identities verified by the system.

Notwithstanding, the method can include the survey system extracting 1010 at least a portion of responses from a survey questionnaire. For example, the customer provides written responses to open ended questions, such as when the customer fills out text input boxes on the GUI of FIG. 5 asking about what the customer liked about their experience or what they think the merchant can improve upon such as boxes 505 and 510. These text input boxes can be scraped and converted into a social network message.

As mentioned above, this text can be extracted and converted into a web form if the text content is generally positive in nature. In some embodiments the survey system can scan the textual content for words that indicate positive experiences for the customer.

Next, the method can include populating 1015 a web form with the extracted at least a portion of responses to create a social network message. In some embodiments, the web form can comprise links to social networks. The user can select the links or icons (see FIG. 6) to indicate which social networks they wish to post their message on. An example web form is illustrated in FIG. 6. This web form includes a text box 605 that includes the textual content that was scraped or extracted from a survey questionnaire. The text input box is editable in some embodiments, allowing the customer to edit the text content as desired. Thus, survey system can populate the editable text input box with the portion of the responses extracted from the survey and receive changes to the text, if the customer desires.

Once the customer is ready to create the social network message, the method can includes receiving 1020 selections of the social networks as mentioned above. In some embodiments, the customer can pre-select their social network accounts. In some embodiments, the customer can select their social network accounts from social network accounts managed or associated with merchants that were involved in the transaction that was the subject of the survey questionnaire.

Next, the method can include providing 1025 the social network message to the selected social networks. For example, the survey system can generate an XML file (see example XML output in FIG. 7C) that is delivered to each of the social network systems through an API or other similar mechanism.

The method can also include processes for closing the loop relative to the social network message. For example, the method can include receiving 1030 confirmation that consumer 140 has successfully submitted the social network message to the selected social networks. Following confirmation, the system can send out rewards or other incentives as described in greater detail above.

Figure 11:
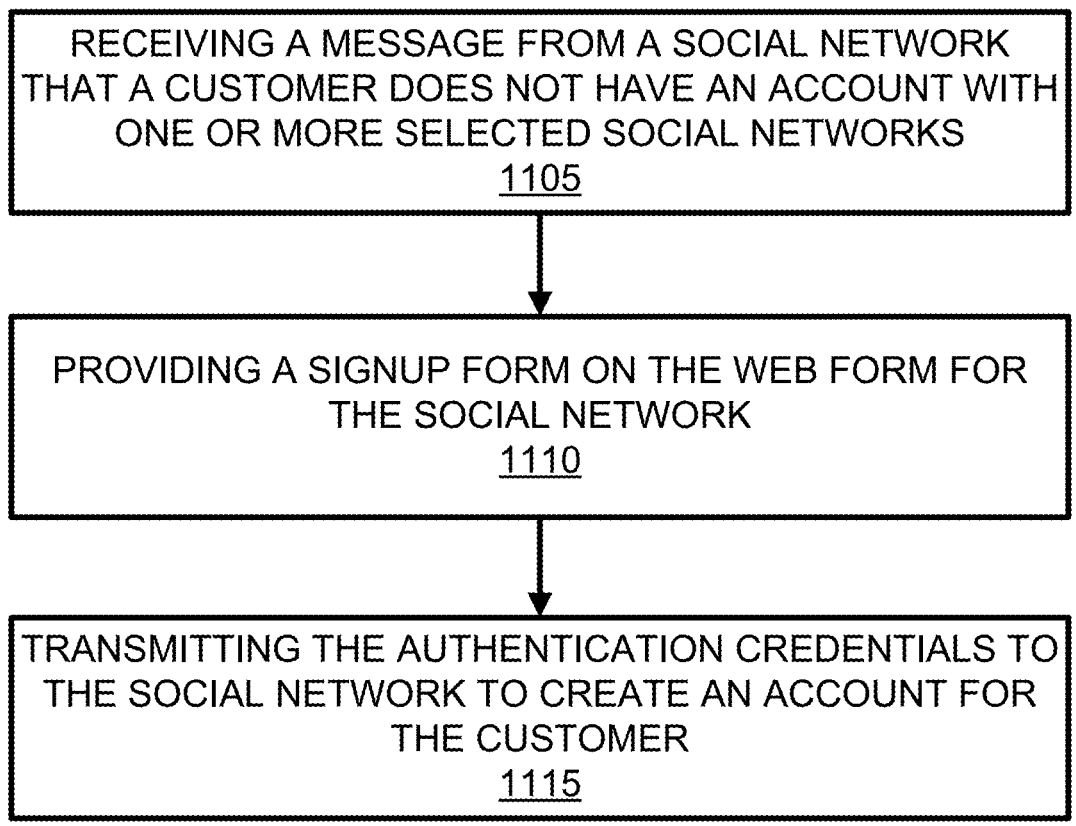
FIG. 11 is a flowchart of a method for obtaining customer feedback and creating a social network account for the customer providing the feedback, according to various embodiments.

FIG. 11 is an example flowchart of a method that includes creating a web form that allows a customer to provide feedback to survey questions as well as provide login credentials to create an account on a social network. For example, the customer may not have an account on the social network of the merchant associated with a particular transaction that involved the customer. To these ends, the method includes receiving 1105 a message from a social network that a customer does not have an account with one or more selected social networks. To be sure, this process can occur when the survey system transmits a social network message to a social network. The social network may respond that the customer does not have an account. This process can also occur prior to sending the social network message to the social network by performing an account check on the customer using identifying information such as a name or email address.

In some embodiments, the method includes providing 1110 a signup form on the web form for the social network. To be sure, the signup form is configured to receive authentication credentials for the customer such as a username and password. An example web form with a signup form 705 is illustrated in FIG. 7A.

Next, the method can comprise transmitting 1115 the authentication credentials to the social network to create an account for the customer. The system can then proceed to provide the social network with the social network message, once the account is created and the customer has logged into their account.

To be sure, it is advantageous to allow a customer to provide feedback to a survey within the same web form that the customer uses to establish a social network account for a social network. This provides at least some level of authentication and verification that the person creating the review is the same as the person providing login credentials to the social network that will post the social network message created from the review. Again, the login credentials can be requested to post to an already created social network account for the customer or they can be used to create a new account for the customer if the customer does not have an account with the social network.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 900 may be implemented as a cloud-based computing environment, such as a virtual machine operating within a computing cloud. In other embodiments, the computing system 900 may itself include a cloud-based computing environment, where the functionalities of the computing system 900 are executed in a distributed fashion. Thus, the computing system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 500, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

While the present technology has been described in connection with a series of preferred embodiment, these descriptions are not intended to limit the scope of the technology to the particular forms set forth herein. It will be further understood that the methods of the technology are not necessarily limited to the discrete steps or the order of the steps described. To the contrary, the present descriptions are intended to cover such alternatives, modifications, and equivalents as may be included within the spirit and scope of the technology as defined by the appended claims and otherwise appreciated by one of ordinary skill in the art.

What is claimed is:

1. A method, comprising:
   transmitting a purchase questionnaire to a customer of a merchant, the purchase questionnaire comprising questions relating to a previous purchase made by the customer of the merchant;
   receiving responses to the purchase questionnaire, transaction information, and identifying information that is unique to the customer, from a computing device of the customer to a server, the server communicatively coupled over a network to the computing device of the customer and social network systems;
   upon receiving the responses to the purchase questionnaire, transaction information, and identifying information that is unique to the customer, verifying an identity of the customer by the server, to provide a level of trust that the customer is submitting a verifiable review about the merchant in response to the purchase questionnaire, the verifying further comprising matching the transaction information provided by the customer to transaction information stored in one of sales records and customer logs;
   extracting at least a portion of responses from the purchase questionnaire;
   based on the at least the portion of the responses from the purchase questionnaire, presenting an offer to the customer to produce a trusted social media review regarding the previous purchase, the trusted social media review comprising the verifiable review from the verified customer regarding the previous purchase, the offer including links to the social network systems;
   automatically populating a web form with the extracted the at least the portion of responses to create a social network message, the web form comprising the links to the social network systems, the social network message comprising the trusted social media review regarding the previous purchase;
   receiving by the server, from the computing device of the customer, a first selection of the social network systems and the customer's authentication credentials that can be used by the server to access the customer's social network account with the first selected social network system;
   providing the social network message to the first selected social network system;
   updating the offer to the customer by removing a link to the first selected social network system, so that the customer is encouraged to select links of one or more remaining unselected social network systems, thereby distributing the trusted social media review to a plurality of social network systems; and
   transmitting the updated offer to the customer to provide the trusted social media review to the one or more of the remaining unselected social network systems.

2. The method according to claim 1, wherein the web form comprises an editable text input box, wherein the method further comprises:
   populating the editable text input box with the at least the portion of the responses; and
   receiving changes to the at least the portion of responses.

3. The method according to claim 1, wherein the links of the web form comprise selectable icons for each of the social network systems.

4. The method according to claim 1, further comprising:
   receiving a message from at least one of the social network systems that the customer does not have an account with the at least one of the social network systems;
   providing a signup form on the web form for the at least one of the social network systems, the signup form being configured to receive authentication credentials for the customer; and
   transmitting the authentication credentials to the at least one of the social network systems to create an account for the customer.

5. The method according to claim 1, further comprising scoring the responses of the purchase questionnaire, wherein only customers with scoring that is positive are provided with the web form.

6. The method according to claim 1, further comprising:
   scoring a plurality of purchase questionnaires for the merchant relative to a plurality of attributes, each of the plurality of purchase questionnaires comprising responses to the purchase questionnaire; and
   generating a purchase report for the merchant.

7. The method according to claim 1, further comprising constructing an extensible markup language form for the social network message.

8. The method according to claim 7, further comprising transmitting the extensible markup language form to the social network systems.

9. The method according to claim 1, further comprising receiving confirmation that a consumer has successfully submitted the social network message to the social network systems.

10. The method according to claim 9, further comprising transmitting to the consumer a reward based on the confirmation.

11. A system, comprising:

a survey system that:

transmits a purchase questionnaire to a customer of a merchant, the purchase questionnaire comprising questions relating to a previous purchase made by the customer of the merchant; receives responses to the purchase questionnaire, transaction information, and identifying information that is unique to the customer, from a computing device of the customer to a server, the server communicatively coupled over a network to the computing device of the customer and social network systems;

upon receiving the responses to the purchase questionnaire, transaction information, and identifying information that is unique to the customer, verifies an identity of the customer by the server, to provide a level of trust that the customer is submitting a verifiable review about the merchant in response to the purchase questionnaire, the verifying further comprising matching transaction information provided by the customer to transaction information stored in one of sales records and customer logs of the survey system;

extracts at least a portion of responses from the purchase questionnaire;

based on the at least the portion of the responses from the purchase questionnaire, presents an offer to the customer to produce a trusted social media review regarding the previous purchase, the trusted social media review comprising the verifiable review from the verified customer regarding the previous purchase, the offer including links to social network systems;

automatically populates a web form with the extracted the at least the portion of responses to create a social network message, the web form comprising the links to the social network systems, the social network message comprising the trusted social media review regarding the previous purchase;

receives, from the computing device of the customer, a first selection of the social network systems and the customer's authentication credentials that can be used by the server to access the customer's social network account with the first selected social network system; and provides the social network messages to the first selected social network system;

updates the offer to the customer by removing a link to the first selected social network system, so that the customer is encouraged to select links of one or more remaining unselected social networks, thereby distributing the trusted social media review to a plurality of social network systems; and transmits the updated offer to the customer to provide the trusted social media review to the one or more of the remaining unselected social network systems; and a social network of the social network systems that:

authenticates the customer;

receives the social network message; and posts the social network message for display.

12. The system according to claim 11, wherein the survey system further scores the responses of the purchase questionnaire to determine whether the responses are positive or negative.

13. The system according to claim 11, wherein the survey system communicates with the social network systems through an application programming interface (API).

14. The system according to claim 13, wherein the survey system constructs an extensible markup language form for the social network message.

15. The system according to claim 14, wherein the survey system transmits the extensible markup language form to the social network systems through the API.

16. The method according to claim 1, wherein the web form includes an editable text box that the customer can use to edit text of the trusted social media review.

17. The system according to claim 11, wherein the web form includes an editable text box that the customer can use to edit text of the trusted social media review.

* * * * *